Sept. 13, 1938. C. G. BUTLER Re. 20,852
LUBRICATING APPARATUS
Original Filed Feb. 19, 1923 2 Sheets-Sheet 1
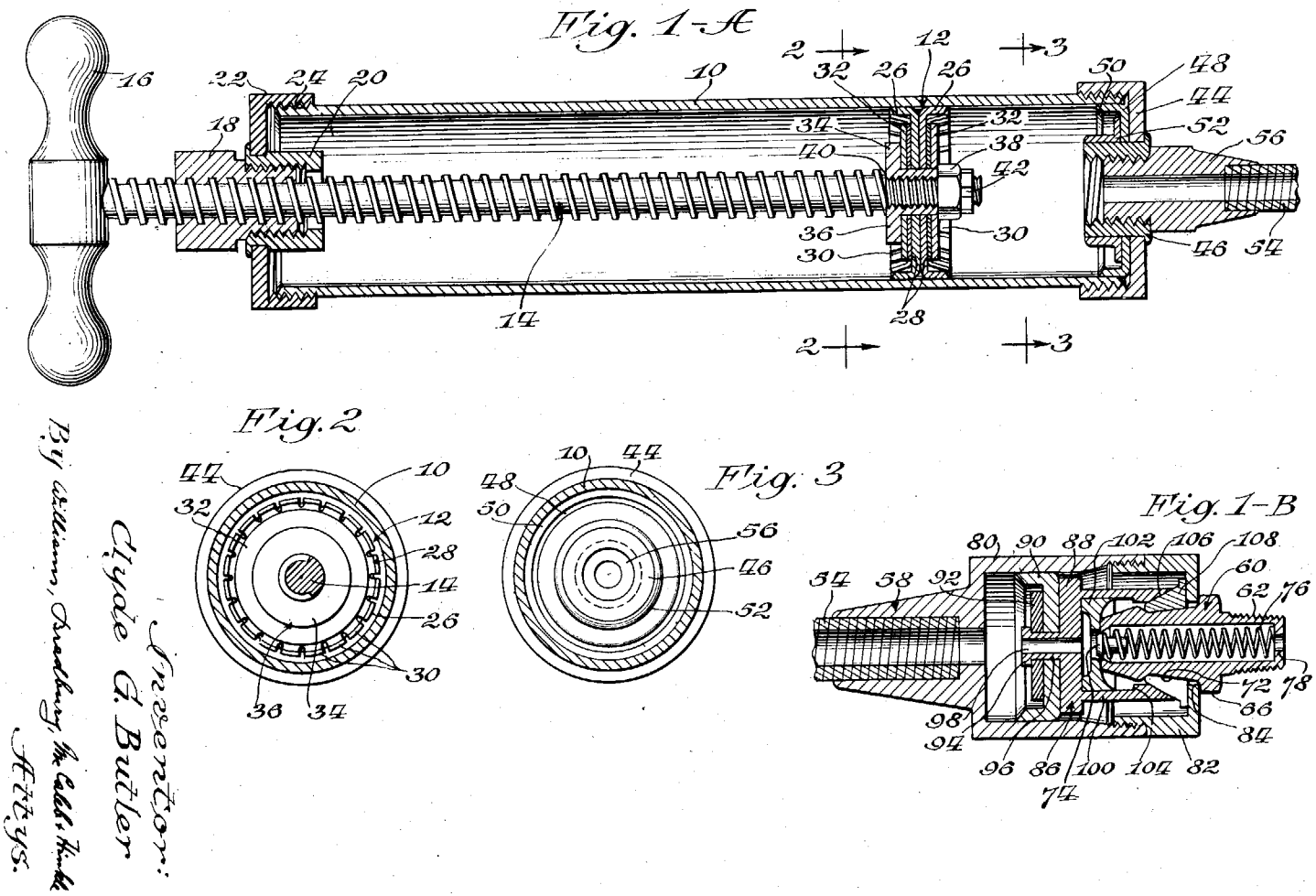
Inventor:
Clyde G. Butler
By Williams, Bradbury, McCaleb & Hinkle
Attys.

Sept. 13, 1938. C. G. BUTLER Re 20,852
LUBRICATING APPARATUS
Original Filed Feb. 19, 1923 2 Sheets-Sheet 2
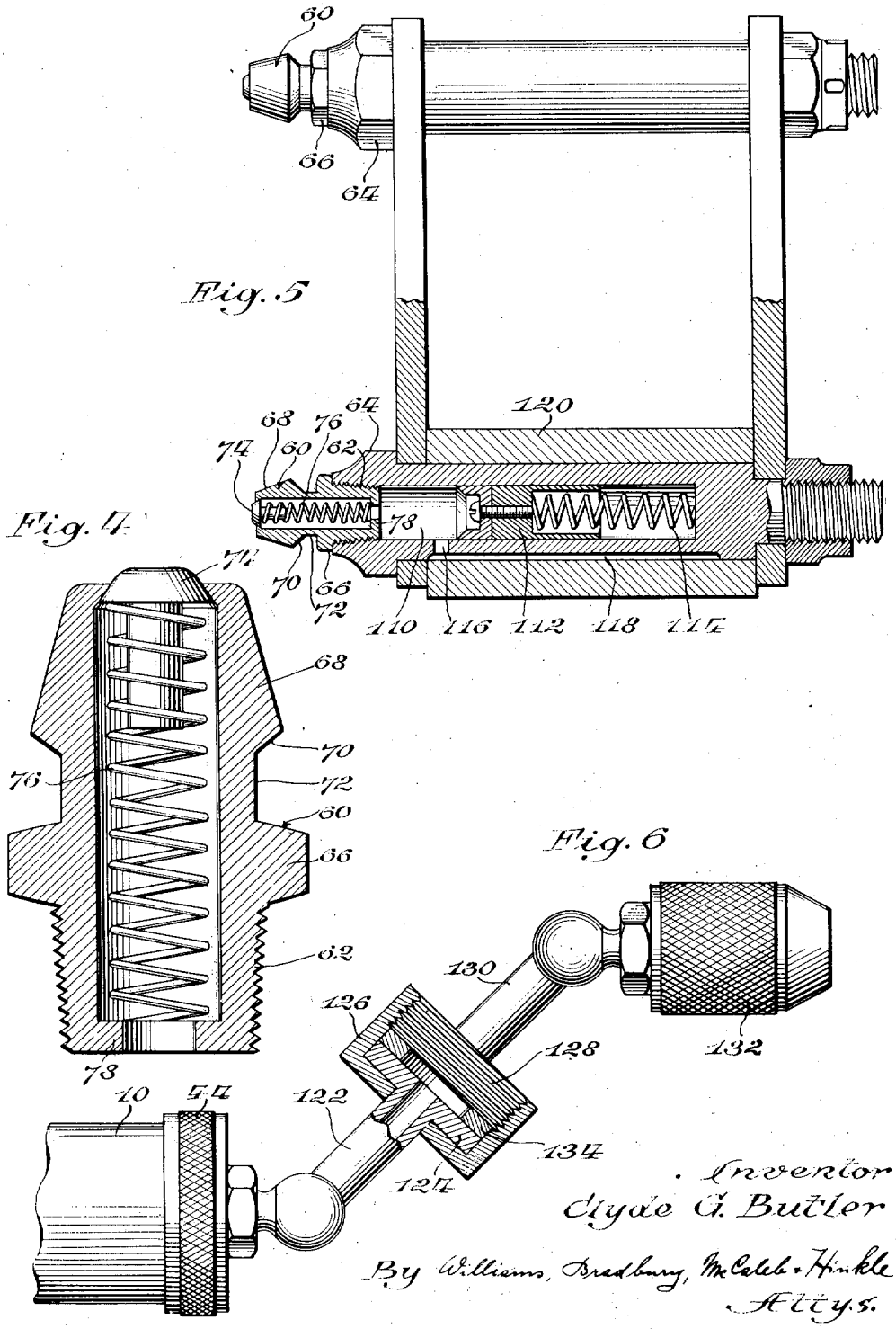
Inventor
Clyde G. Butler
By Williams, Bradbury, McCaleb & Hinkle
Attys.

Reissued Sept. 13, 1938

Re. 20,852

UNITED STATES PATENT OFFICE 20,852

LUBRICATING APPARATUS

Clyde G. Butler, Cincinnati, Ohio, assignor, by mesne assignments, to Stewart-Warner Corporation, Chicago, Ill., a corporation of Virginia Original No. 1,593,791, dated July 27, 1926, Serial No. 619,909, February 19, 1923. Application for reissue May 12, 1938, Serial No. 207,571

2 Claims. (Cl. 285—170)

My invention pertains to lubricating apparatus, and particularly to lubricating apparatus comprising nipples permanently attached to the bearings of automobiles and other machinery and a compressor provided with a coupler for detachably and successively connecting the compressor with the nipples on the automobiles or other machinery.

The object of my invention is to provide a coupler which is automatically actuated by the lubricant pressure created in the compressor to form a sealed interlocking engagement with the lubricant-receiving nipples attached to the bearings of the automobile or other machinery.

Referrings to the drawings,

In Figures 1—A and 1—B I have shown in longitudinal section one form of lubricating apparatus embodying my invention;

Figure 2 is a section on the line 2—2 of Figure 1—A looking in the direction of the arrows and showing one end of the piston;

Figure 3 is a section on the line 3—3 of Figure 1—A looking in the direction of the arrows and showing a plan view of the self-sealing end of the lubricant compressor;

Figure 4 is an enlarged sectional view of the nipple shown in Figure 1—B;

Figure 5 is a view partly in section of a bearing and shackle therefor showing the manner in which the nipple is applied thereto. The particular bearing and shackle shown in this view has a lubricant reservoir and automatic means for feeding the lubricant from the reservoir to the bearing surfaces; and Figure 6 is a view partly in elevation and partly in section showing one way of rigidly connecting my novel coupler to a lubricant compressor.

Referring to the drawings in detail, I have shown in Figure 1—A a lubricant compressor having a cylindrical barrel 10 in which there is mounted a piston 12 which can be moved longitudinally of the barrel 10 by means of a threaded piston rod 14 attached to a suitable handle 16. The piston rod 14 is in threaded engagement with a nut 18 which in turn is screwed into a collar 20 forming a part of the head 22 suitably secured to one end of the barrel 10 as by screw threads 24.

The piston 12 comprises a pair of opposed leather cup washers 26 located between a pair of spring washers 28 having teeth 30 for pressing the flanges of the cup washers against the inside of the cylindrical barrel 10. The leather cup washers 26 and the spring washers 28 are supported by a pair of rigid washers 32 clamped between the flange 34 of a collar 36 and a nut 38. The nut 38 also serves to hold the collar 36 in engagement with the shoulder 40 forming a part of the piston rod 14. The nut 38 is castellated and a cotter pin 42 is provided to hold the nut in place.

The discharge end of the barrel 10 is provided with a cap 44 having an internally threaded ferrule 46 for attachment to one end of a discharge conduit. The joint between the barrel 10 and head 44 is sealed by a leather washer 48 having a flange terminating in a tapered edge 50 for engagement with the interior of the barrel. The washer 48 is retained in place by a collar 52 closely fitting about the ferrule 46.

In Figures 1—A and 1—B, I have shown the compressor as being provided with a flexible discharge conduit or hose 54, whereas in Figure 6 I have shown the compressor as provided with a rigid discharge conduit which I shall hereinafter describe. One end of the flexible hose 54 is provided with a fitting 56 adapted to screw into the ferrule 46 and the other end of the flexible hose is attached to my novel coupler 58 which is adapted to form an interlocking and lubricant-tight connection with a nipple 60.

As best shown in Figures 4 and 5, the nipple 60 comprises a tubular body which is threaded at its outlet end, as indicated at 62, for attachment to a bearing part, such, for example, as the shackle bolt 64. The part 66 of the nipple body is given a hexagonal or other nut-like shape whereby a wrench may be applied to the nipple to screw it into the bearing part. The inlet end of the nipple constitutes a head 68 terminating in a shoulder 70 leading to the throat 72.

The lubricant passage through the nipple is normally closed at its inlet end by a valve 74 which is urged against its seat by a spring 76 resting on a flange 78 forming a part of the tubular body of the nipple. It will be understood that when lubricant is injected into the nipple, the valve 74 moves inwardly under the force exerted by the lubricant thereon and thus permits the lubricant to flow into the passage through the nipple and to the bearing surfaces.

My novel coupler is best shown in Figure 1—B and comprises a cylinder 80 provided with a cap 82 having an opening 84 for receiving the inlet end of a nipple. A piston 86 is reciprocably mounted in the cylinder 80 and comprises a metal base 88, a cup-shaped leather sealing washer 90, and a metal washer 92, all held together by the flange 94 on the tubular extension 96 of the base 88.

The extension 96 has an aperture 98 through which lubricant can flow to the interior of a cylindrical extension 100 projecting forwardly from the base 88. A leather sealing gasket 102 is reciprocably mounted in the cylindrical extension 100 between the base 88 and a shoulder 104 and is acted upon by the lubricant pressure to form a lubricant-tight seal with the inlet end of the nipple 60.

The right-hand end of the cylindrical extension 100 is tapered as indicated at 106 and acts upon the correspondingly tapered portions of locking jaws 108 to force them into engagement with the throat 72 of the nipple, the cap 82 serving to limit longitudinal movement of the jaws 108 under the force exerted thereon by the extension 100. The right-hand end of the cylindrical extension 100 may be slitted longitudinally to form spring fingers capable of compensating for nipples having eccentric throats.

When the compressor shown in Figure 1—A is empty and the piston is in advanced position, the compressor may be rapidly filled with lubricant in the manner which I shall now describe: The nut 18 is first unscrewed from the collar 20 and the coupler of the compressor is then immersed in a source of lubricant. The piston 12 can then be retracted by a longitudinal pull on the handle 16, thereby drawing lubricant into that part of the barrel 10 which is to the right of the piston 12 and expelling air from the left-hand side of the piston through the opening between the piston rod 14 and the collar 20. After the compressor has been filled with lubricant, the nut 18 is screwed down on the piston rod toward the piston 12 and is again engaged with the collar 20. The compressor is now in condition to perform the lubricating operation.

In order to connect the lubricant compressor with the nipple attached to the bearing to be lubricated, it is only necessary to push my novel coupling 58 over the end of the nipple 60. The handle 16 of the compressor may then be rotated to discharge lubricant from the barrel 10 under high pressure. The lubricant thus discharged from the barrel 10 flows through the flexible hose 54 to the cylinder 80 where it acts upon the left-hand side of the piston 86 to move it toward the right, due to the fact that lubricant will be forced into the cylinder 80 at a greater rate than it can flow through the relatively small aperture 98 in the piston. This forward movement of the piston 86 causes the jaws 108 to grip firmly about the throat of the nipple and thus forms an interlocking engagement between the coupler and nipple.

The lubricant flowing through the aperture 98 in the piston 86 enters the space behind the leather gasket 102 and moves it toward the right until it seals firmly against the end surface of the nipple 60. Thereafter lubricant flows through the opening in the leather gasket 102, displaces the valve 74 at the inlet end of the nipple, and flows into and through the nipple to the bearing surfaces. The gripping action of the jaws 108 under the force exerted thereon by the piston 86 is maintained as long as lubricant pressure exists in the coupler. After the lubricating operation has been completed, it is only necessary to relieve the lubricant pressure in the compressor and coupler in order to permit ready removal of the coupler from the nipple. In the particular compressor shown, such release of pressure can be accomplished by screwing backwardly on the handle 16 to retract the piston 12. Thereafter the coupler can be easily withdrawn from the nipple 60. As the coupler is withdrawn, the jaws 108 move radially outwardly and cause the piston 86 to move to the left as viewed in Figure 1—B to permit this outward movement of the jaws 108.

From the foregoing description of the operation of one form of lubricating apparatus embodying my invention, it will be seen that I have provided a coupler which may be readily applied to and removed from a nipple and wherein the gripping and sealing functions are performed automatically by the lubricant pressure created by the lubricant compressor. Because of its ease of application and removal, my novel coupler is particularly desirable in reaching the restricted areas frequently found on automotive vehicles where this type of lubricating equipment is especially useful.

Referring to Figure 5 I have shown nipples 60 screwed into shackle bolts 64 provided with lubricant reservoirs 110. When lubricant is forced into the reservoir 110 under great pressure, the lubricant entering the reservoir through the nipple 60 forces back the piston 112 against the tension of its spring 114. After the reservoir 110 has been completely filled and the compressor and coupler disconnected from the nipple 60, the valve 74 in the nipple prevents escape of lubricant from the reservoir by way of this nipple. The lubricant in the reservoir 110 is thus constantly subjected to the pressure exerted thereon by the piston 112 and spring 114 which serves to force lubricant from this reservoir through the outlet opening 116 into a lubricating channel 118 to lubricate the engaging surfaces of the shackle bolt 64 and its encircling member 120. In this manner fresh, clean, grease is constantly forced into engagement with the bearing surfaces and the used lubricant or lubricant which may have become contaminated by foreign material is constantly forced outwardly from between these bearing surfaces.

In Figure 6 I have shown one type of rigid discharge conduit which may be used in lieu of the flexible hose 54 of Figures 1—A and 1—B. In this figure I have shown a rigid tubular member 122 connected at an angle to the discharge end of the barrel 10 of the lubricant compressor. The tubular member 122 has a flange 124 located in a swiveled sleeve 126 adapted to make a threaded connection with the head 128 of a second rigid tubular member 130 mounted at an angle to the coupler 132. A gasket 134 is interposed between the flange 124 and head 128 to seal the joint therebetween.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:

1. A coupler for connecting a lubricant compressor with a nipple for receiving lubricant, said coupler comprising a cylinder, a piston movable within the cylinder, and having an aperture for the discharge of lubricant therethrough and an apertured seat for engagement with the end of the nipple, and means carried by the cylinder for compressively engaging about the nipple for locking said parts together against longitudinal displacement and actuated by said piston whereby the pressure of the lubricant on said piston will move the piston to forcibly compress said means, while lubricant is passing through said connecting parts.

2. A coupler for connecting a lubricant compressor with a headed nipple for receiving lubricant, said coupler comprising a cylinder, a piston movable within the cylinder, and having an aperture for the discharge of lubricant therethrough, an apertured sealing seat carried by said piston for engagement with the end of the nipple, connecting the piston aperture with a passage through the nipple, radially movable locking elements carried by the cylinder coacting with the nipple and actuated by said piston for compressively clutching the elements upon the nipple whereby the pressure of the lubricant on said piston will move the piston to forcibly compress said elements while the lubricant is passing through said connecting parts.

CLYDE G. BUTLER.